Patented July 26, 1949

2,477,048

UNITED STATES PATENT OFFICE 2,477,048

PYRIDOACRIDINES

James Dobson, Manchester, England, and William Chalmers Hutchison and William Ogilvy Kermack, Edinburgh, Scotland, assignors to Imperial Chemical Industries Limited, a corporation of Great Britain No Drawing. Application February 15, 1946, Serial No. 647,995. In Great Britain February 17, 1945

5 Claims. (Cl. 260—279)

This invention relates to the manufacture of new pyridoacridine compounds which are useful as intermediates in the manufacture of chemotherapeutic agents and especially of the parasiticidal agents of our copending application Serial No. 647,996 of even date herewith.

We have now found that new 9-halogeno-1:2:3′:2′-pyridoacridines optionally bearing in either or both of the 3- and 6-positions a nonacidic substituent, for example, a halogen atom, can be made by a process comprising the interaction of a halogenating agent as hereinafter defined with a 2-(quinolyl-(6′)-amino)-benzoic acid (i. e. a quinolyl-(6′)-anthranilic acid) optionally bearing a non-acidic substituent in either or both of the 4- and 8′-positions or with the corresponding 2-quinolylamino-benzoyl chloride or bromide, or with the corresponding 1:2:3′:2′-pyridoacridone (which may be derived from the acid or acid chloride or bromide by ring-closure between the acyl group and the 5-carbon of the quinoline ring).

For clarity it may be mentioned that in this specification the numbering adopted for the acridine ring is that used by Beilstein (see 4th edition, vol. 20, p. 459).

The halogenating agent to be used in this process is the pentachloride, pentabromide, oxychloride or oxybromide of phosphorus or a mixture of such compounds, for example a mixture of phosphorus pentachloride and phosphorus oxychloride.

The reaction is brought about by heating the reagents together, optionally in presence of a solvent or diluent. This may conveniently be an excess of phosphorus oxychloride.

The new compounds are yellow crystalline solids. They are stable to alkalies but are gradually hydrolysed by water or by acids, particularly at elevated temperatures, forming the corresponding pyridoacridones.

The following examples illustrate, but do not limit, the invention; the parts are by weight.

Example 1

6.6 parts of 2-(quinolyl-(6′)-amino)-benzoic acid (made by refluxing potassium o-chlorobenzoate and 6-amino-quinoline with a trace of copper bronze in amyl alcohol for 6 hours), are refluxed with 30 parts of phosphorus oxychloride at 150° C. for 4 hours. The excess of phosphorus oxychloride is then removed by distillation under reduced pressure and the brown residue is cooled, powdered and triturated with cold 20% aqueous sodium hydroxide whereby the 9-chloro-1:2:3′:2′-pyridoacridine is obtained as a pale brown crystalline solid. During the trituration with sodium hydroxide great care must be taken that the powdered solid residue is added to the alkali in small quantities so that neutralisation of any acid takes place immediately and without local heating; otherwise a considerable proportion of the chloro compound may be hydrolysed to the acridone. Finally the chloro compound is filtered by suction, washed until neutral and recrystallised from benzene, from which it separates in pale yellow needles, M. P. 181.5° C.

Example 2

1.1 parts of 1:2:3′:2′-pyridoacridone (made from 2-(quinolyl-(6′)-amino)-benzoic acid by heating to 100° C. with concentrated sulphuric acid so as to effect ring-closure between the carboxyl group and the 5-carbon of the quinoline ring) are heated with 1.0 part of phosphorus pentachloride and 10 parts of phosphorus oxychloride at 140° C. for 5 hours. The phosphorus oxychloride is removed by distillation under reduced pressure and the 9-chloro-1:2:3′:2′-pyridoacridine is isolated as described in Example 1. The recrystallised material melts at 180° C.

Example 3

7 parts of 4-chloro-2-(quinolyl-(6′)-amino)-benzoic acid (made by refluxing potassium 2:4-dichloro-benzoate and 6-amino-quinoline with a trace of copper bronze in amyl alcohol for 6 hours), are heated with 30 parts of phosphorus oxychloride at 150° C. for 4 hours. The excess of phosphorus oxychloride is then removed by distillation under reduced pressure and the 6:9-dichloro-1:2:3′:2′-pyridoacridine is isolated as described in Example 1. After recrystallisation from benzene the compound is obtained in the form of yellow needles, M. P. 219° C.

Example 4

4-chloro-2-(quinolyl-(6′)-amino)-benzoyl chloride is first made by adding 2.4 parts of thionyl chloride dissolved in 15 parts of chloroform to 6 parts of 4-chloro-2-(quinolyl-(6′)-amino)-benzoic acid in 120 parts of chloroform, maintaining the solution at room temperature for 4 hours and then completing the reaction by boiling for a further hour. The chloroform and excess thionyl chloride are then removed by distillation. The crude 4-chloro-2-(quinolyl-(6′)-amino)-benzoyl chloride (M. P. 218–9° C.) which remains is suitable for the process of cyclisation by phosphorus oxychloride. That it is the acid chloride is shown by the fact that when warmed with ethyl alcohol for 2 minutes it at once forms the ethyl ester, M. P. 108° C.

6.3 parts of this acid chloride are refluxed with 25 parts of phosphorus oxychloride for 4 hours at 150° C. The excess of phosphorus oxychloride is then removed by distillation under reduced pressure and the 6:9-dichloro-1:2:3':2'-pyridoacridine is isolated as described in Example 1. Recrystallisation from benzene yields yellow needles M. P. 214° C.

Example 5

6 parts of 2-(8'-chloroquinolyl-(6')-amino)-benzoic acid (conveniently made by heating potassium o-chlorobenzoate and 8-chloro-6-amino-quinoline with a trace of copper bronze in amyl alcohol under reflux for 6 hours) and 50 parts of phosphorus oxychloride are heated together under reflux for 4 hours at 150° C. The excess of phosphorus oxychloride is then distilled off under diminished pressure and the residue is worked up by the method described in Example 1. There is thus obtained 3:9-dichloro-1:2:3':2'-pyrido-acridine which after crystallisation from dry benzene has M. P. 208° C.

Example 6

By working in the manner described in Example 5 but using as starting material 4-chloro-2-(8'-chloroquinolyl-(6')-amino)-benzoic acid (conveniently made by heating potassium 2:4-dichlorobenzoate and 8-chloro-6-amino-quinoline together in amyl alcohol under reflux for 6 hours in presence of a trace of copper bronze) there is obtained 3:6:9-trichloro-1:2:3':2'-pyridoacridine which after recrystallisation from dry benzene has M. P. 286° C.

Example 7

2.5 parts of 3-methyl-6-chloro-1:2:3':2'-pyridoacridone (M. P. 383° C., decomp., conveniently made by heating 4-chloro-2-(8'-methylquinolyl-(6')-amino)-benzoic acid with concentrated sulphuric acid), 1 part of phosphorus pentachloride and 30 parts of phosphorus oxychloride are heated under reflux at 150° C. for 6 hours. The excess of phosphorus oxychloride is then distilled off under diminished pressure and the residue is worked up by the method described in Example 1. There is thus obtained 3-methyl-6:9-dichloro-1:2:3':2'-pyridoacridine which after recrystallisation from dry benzene has M. P. 232° C.

Whereas the above description and examples illustrate many widely varied embodiments of the invention it will be apparent to one skilled in the art that many other embodiments and variations may be devised without departing from the spirit and scope thereof and accordingly it is to be understood that the invention is not in any way limited except as defined in the following claims.

We claim:

1. As new compounds, 9-halogeno-1:2:3':2'-pyridoacridines, bearing in the 3 and 6-positions substituents selected from the group consisting of hydrogen, halogen and methyl.
2. As new compounds, 9-halogeno-1:2:3':2'-pyridoacridines, bearing a chlorine atom in at least one of the 3,6-positions.
3. 9-chloro-1:2:3':2'-pyridoacridine.
4. 6:9-dichloro-1:2:3':2'-pyridoacridine.
5. 3:6:9-trichloro-1:2:3':2'-pyridoacridine.

JAMES DOBSON.
WILLIAM CHALMERS HUTCHISON.
WILLIAM OGILVY KERMACK.

REFERENCES CITED

The following references are of record in the file of this patent:

UNITED STATES PATENTS

| Number | Name | Date |
|---|---|---|
| 1,782,727 | Jensch | Nov. 25, 1930 |
| 2,389,147 | Friedheim | Nov. 20, 1945 |

OTHER REFERENCES

Berichte, vol. 39, pp. 356–369 and 298–310 (1906).

Berichte, vol. 55, pp. 2049–2058 (1922).

Sidgwick, "Organic Chemistry of Nitrogen" (Oxford University Press, 1937), pages 522 and 523.

Berichte, vol. 75, pp. 1008–1015 (1942).

J. Am. Chem. Soc., 64, pages 2894–2898 (1942).